United States Patent
Liu

(10) Patent No.: US 9,996,960 B2
(45) Date of Patent: Jun. 12, 2018

(54) AUGMENTED REALITY SYSTEM AND METHOD

(71) Applicant: Institute For Information Industry, Taipei (TW)

(72) Inventor: Chi-Hsien Liu, Changhua County (TW)

(73) Assignee: Institute For Information Industry, Taipei (TW)

( * ) Notice: Subject to any disclaimer, the term of this patent is extended or adjusted under 35 U.S.C. 154(b) by 0 days. days.

(21) Appl. No.: 15/359,599

(22) Filed: Nov. 22, 2016

(65) Prior Publication Data

US 2018/0114349 A1    Apr. 26, 2018

(30) Foreign Application Priority Data

Oct. 21, 2016  (TW) .............................. 105134047 A

(51) Int. Cl.
  *G06T 19/00*    (2011.01)
  *G06T 11/60*    (2006.01)
  (Continued)

(52) U.S. Cl.
  CPC ............ *G06T 11/60* (2013.01); *G06T 3/0006* (2013.01); *G06T 7/0044* (2013.01); *G09G 5/14* (2013.01); *G06T 2207/10028* (2013.01)

(58) Field of Classification Search
  None
  See application file for complete search history.

(56) References Cited

U.S. PATENT DOCUMENTS

2012/0314936 A1  12/2012  Ishige et al.
2014/0002597 A1   1/2014  Taguchi et al.
(Continued)

FOREIGN PATENT DOCUMENTS

TW    201205345 A1    2/2012
TW    201429242 A     7/2014
(Continued)

OTHER PUBLICATIONS

Chekhlov et al., "Ninja on a Plane: Automatic Discovery of Physical Planes for Augmented Reality Using Visual SLAM", IEEE, 2007.*
(Continued)

*Primary Examiner* — Nicholas R Wilson
(74) *Attorney, Agent, or Firm* — Skaar Ulbrich Macari, P.A.

(57) ABSTRACT

An augmented reality system and method include: building a first point cloud coordinate system at a first physical location and a second point cloud coordinate system at a second physical location according to depth information of first physical content and second physical content respectively; creating first virtual content based on the first point cloud coordinate system; determining at least one plane in the first point cloud coordinate system; determining at least one plane point in the at least one plane; computing coordinate variance of the at least one plane point from the first point cloud coordinate system to the second point cloud coordinate system; calculating a location of the first virtual content in the second point cloud coordinate system according to the coordinate variance to create corresponding second virtual content on the location; and displaying the second physical content and virtual content at the second physical location.

10 Claims, 5 Drawing Sheets

(51) Int. Cl.
*G06T 7/00* (2017.01)
*G06T 3/00* (2006.01)
*G09G 5/14* (2006.01)

(56) References Cited

U.S. PATENT DOCUMENTS

| | | | |
|---|---|---|---|
| 2014/0192164 A1 | 7/2014 | Tenn et al. | |
| 2015/0062120 A1* | 3/2015 | Reisner-Kollmann | G06T 19/006 345/419 |
| 2016/0163107 A1 | 6/2016 | Chen et al. | |

FOREIGN PATENT DOCUMENTS

| | | |
|---|---|---|
| TW | 201606352 A | 2/2016 |
| TW | 201621799 A | 6/2016 |

OTHER PUBLICATIONS

Office Action to the corresponding Taiwan Patent Application rendered by the Taiwan Intellectual Property Office (TIPO) dated May 11, 2017, 9 pages (including summary English translation).

\* cited by examiner

AUGMENTED REALITY SYSTEM AND METHOD

PRIORITY

This application claims priority to Taiwan Patent Application No. 105134047 filed on Oct. 21, 2016, which is hereby incorporated herein by reference in its entirety.

FIELD

The present invention relates to an augmented reality system and method. More specifically, the present invention relates to an augmented reality system and method capable of creating virtual contents without feature point maps.

BACKGROUND

Augmented reality (AR) is a technology for augmenting virtual contents in the physical world. One application of the augmented reality technology is to enable users to see physical contents in the physical world and the virtual contents in the virtual world at the same time through a displaying apparatus. Generally, the physical content may be provided by an image capturing apparatus (e.g., a camera), and the virtual content may be provided by a computing apparatus. Because the physical content displayed by the displaying apparatus changes as the image capturing apparatus moves (involving changes of location and/or direction), the computing apparatus must provide the corresponding virtual content as the image capturing apparatus moves to keep the augmented reality effective. For example, if a user faces a front surface of a vase at the beginning, and the displaying apparatus displays the front surface of the vase and a front surface of a bunch of virtual flowers placed in the vase at the beginning, then the displaying apparatus must display a side surface of the vase and a side surface of the bunch of virtual flowers in real time when the user moves to another location and faces the side surface of the vase.

To enable the computing apparatus to provide the corresponding virtual content as the image capturing apparatus moves, the conventional augmented reality technology generally creates in advance a plurality of feature point maps for the physical contents of a same target that are captured by the image capturing apparatus at various locations and/or directions. When the location and/or direction of the image capturing apparatus changes, the conventional augmented reality technology uses feature points on the feature point maps to identify the current location and/or direction of the image capturing apparatus, thereby obtaining the change in the location and/or direction of the image capturing apparatus. In this way, when the image capturing apparatus moves, the conventional augmented reality technology provides the corresponding virtual content according to the change in the location and/or direction of the image capturing apparatus.

The conventional augmented reality technology is actually limited and inconvenient to a large extent. For example, a plurality of feature point maps have to be created in advance (which increases the time cost), and the physical content captured by the image capturing apparatus has to comprise enough available feature points (i.e., the space complexity of the physical content must be relatively high). Accordingly, an urgent need exists in the art to improve the aforesaid problems of the conventional augmented reality technology.

SUMMARY

To achieve the aforesaid objective, an aspect of the present invention may be an augmented reality system. The augmented reality system may comprise an image capturing apparatus, a depth sensing apparatus, a computing apparatus and a displaying apparatus.

The image capturing apparatus may be configured to capture a first physical content at a first physical location and capture a second physical content at a second physical location. The depth sensing apparatus may be configured to sense a depth of each pixel of the first physical content to build a first point cloud coordinate system, and sense a depth of each pixel of the second physical content to build a second point cloud coordinate system. The computing apparatus may be configured to generate a first virtual content based on the first point cloud coordinate system. The computing apparatus may also be configured to determine at least one plane in the first point cloud coordinate system, and determine at least one plane point in the at least one plane. The computing apparatus may also be configured to compute coordinate variance of the at least one plane point from the first point cloud coordinate system to the second point cloud coordinate system, and calculate a location of the first virtual content in the second point cloud coordinate system according to the coordinate variance to create a corresponding second virtual content on the location. The displaying apparatus may be configured to display a first view at the first physical location and display a second view at the second physical location. The first view comprises the first physical content and the first virtual content, and the second view comprises the second physical content and the second virtual content.

To achieve the aforesaid objective, another aspect of the present invention may be an augmented reality method. The augmented reality method may comprise the following steps:

capturing a first physical content at a first physical location by an image capturing apparatus;

sensing a depth of each pixel of the first physical content by a depth sensing apparatus to build a first point cloud coordinate system;

generating a first virtual content based on the first point cloud coordinate system by a computing apparatus;

displaying a first view at the first physical location by a displaying apparatus, wherein the first view comprises the first physical content and the first virtual content;

capturing a second physical content at a second physical location by the image capturing apparatus;

sensing a depth of each pixel of the second physical content by the depth sensing apparatus to build a second point cloud coordinate system for a second view;

determining at least one plane in the first point cloud coordinate system by the computing apparatus;

determining at least one plane point in the at least one plane by the computing apparatus;

computing coordinate variance of the at least one plane point from the first point cloud coordinate system to the second point cloud coordinate system by the computing apparatus;

calculating a location of the first virtual content in the second point cloud coordinate system according to the coordinate variance by the computing apparatus to create a second virtual content on the location; and displaying a second view at the second physical location by the displaying apparatus, wherein the second view comprises the second physical content and the second virtual content.

According to the above descriptions, when the image capturing apparatus moves, the present invention may build a first point cloud coordinate system and a second point cloud coordinate system respectively according to depth information of the physical contents captured by the image capturing apparatus before and after the movement thereof.

Also, the present invention may transfer the virtual content generated based on the first point cloud coordinate system to the second point cloud coordinate system according to the coordinate variance of the at least one plane point of the at least one plane in the first point cloud coordinate system from the first point cloud coordinate system (i.e., the previous point cloud coordinate system) to the second point cloud coordinate system (i.e., the current point cloud coordinate system) to obtain the location of the virtual content, which is generated based on the first point cloud coordinate system, in the second point cloud coordinate system, and then generate the corresponding virtual content on the location.

Different from the conventional augmented reality technology, the present invention enables the computing apparatus to provide the corresponding virtual content as the image capturing apparatus moves without the need of creating a plurality of feature point maps in advance, so the time cost can be saved. Additionally, the present invention only uses the plane information of the physical content captured by the image capturing apparatus (i.e., at least one plane point of at least one plane in the first point cloud coordinate system), so the same effect can be achieved even if the space complexity of the physical content captured by the image capturing apparatus is not high. In other words, the physical content captured by the image capturing apparatus does not need to comprise many available feature points in the present invention. Thus, the present invention effectively improves the conventional augmented reality technology.

What described above presents a summary of the present invention (including the problem to be solved, the ways to solve the problem and the effect of the present invention) to provide a basic understanding of the present invention. However, what described above is not intended to contemplate all aspects of the present invention. Additionally, what described above is neither intended to identify key or essential elements of any or all aspects of the present invention, nor intended to describe the scope of any or all aspects of the present invention. This summary is provided only to present some concepts of some aspects of the present invention in a simple form and as an introduction to the following detailed description.

The detailed technology and preferred embodiments implemented for the subject invention are described in the following paragraphs accompanying the appended drawings for people skilled in this field to well appreciate the features of the claimed invention.

DETAILED DESCRIPTION

One or more example embodiments described below are not intended to limit the present invention to any specific examples, embodiments, environment, applications, structures, processes or steps described in these example embodiments. In the attached drawings, elements unrelated to the present invention are omitted from depiction; and dimensions and dimensional relationships among individual elements in the attached drawings are only exemplary examples and are not intended to limit the present invention. Unless stated particularly, same (or similar) element labels may correspond to same (or similar) elements in the following description.

Figure 1:
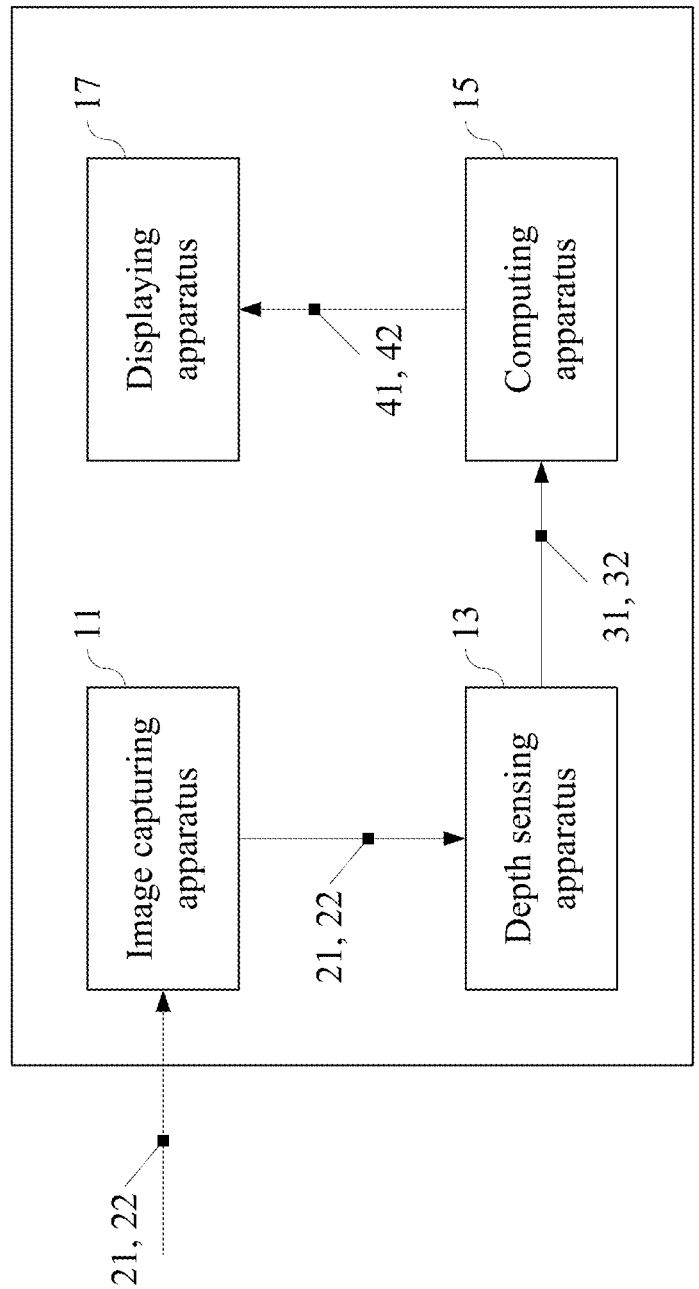
FIG. 1 illustrates an architecture of an augmented reality system according to one or more embodiments of the present invention.

FIG. 1 illustrates an architecture of an augmented reality system according to one or more embodiments of the present invention. Referring to FIG. 1, an augmented reality system 1 may comprise an image capturing apparatus 11, a depth sensing apparatus 13, a computing apparatus 15 and a displaying apparatus 17. The augmented reality system 1 may be any of various electronic apparatuses, for example but not limited to mobile phones, notebook computers, tablet computers, desktop computers or the like. The image capturing apparatus 11, the depth sensing apparatus 13, the computing apparatus 15 and the displaying apparatus 17 may be electrically connected to each other directly or indirectly, and data can be transmitted among the apparatuses.

The image capturing apparatus 11 may be any of various known apparatuses capable of capturing images, e.g., cameras/camcorders of various types or a part thereof. Main elements comprised in the cameras/camcorders may be for example photosensitive imaging elements, imaging mediums and imaging control structures or the like. The photosensitive imaging elements are typically a set of lenses made of optical glass, i.e., camera lenses. The imaging mediums are responsible for capturing and recording images and include for example films, charge-coupled devices (CCDs), complementary metal-oxide-semiconductors (CMOSs) or the like. The imaging control structures can change the way of imaging or recording the image, and control parameters such as the aperture, the shutter, the focal length or the like. Depending on the imaging mediums, the cameras/camcorders may be divided into film cameras/camcorders and digital cameras/camcorders, the film cameras/camcorders are cameras/camcorders that record images through chemical change on the film caused by the light, and the digital cameras/camcorders are cameras/camcorders that transform optical images into electronic data by using an electronic sensor.

The depth sensing apparatus 13 may be any of various known apparatuses capable of sensing the depth of an image, and it may be an apparatus independent of the image capturing apparatus 11 or an internal apparatus of the image capturing apparatus 11. The depth sensing apparatus 13 generally may be formed by the combination of a CMOS image sensor, an algorithm, an external element for auxiliary sensing effect (e.g., an active infrared element) and a processor. For example, the depth sensing apparatus 13 may comprise a three-dimensional scanner to detect and analyze the shape (geometric construction) and appearance data (e.g., properties such as the color, the surface albedo or the like) of an object or an environment in the real world. The three-dimensional scanner may be configured to create point clouds of the geometric surface of the object, these points can form the surface shape of the object through interpolation, and denser point clouds can create a more accurate model (this process is called three-dimensional reconstruction). The three-dimensional scanner is analogous to the camera, and the difference therebetween lies in that the camera captures color information while the three-dimensional scanner measures the distance (i.e., the depth).

The computing apparatus 15 may be any of various known apparatuses capable of image processing. The computing apparatus 15 may comprise various operation elements (e.g., a processor, a microprocessor or the like) to execute various logic operations. The computing apparatus 15 may comprise various storage elements (e.g., a memory, a hard disk or the like) to store various data. The computing apparatus 15 may comprise various input/output elements (e.g., a mouse, a keyboard, a user interface, a screen or the like) to receive data from the outside and output data to the outside. The computing apparatus 15 can execute various image processing through elements such as the aforesaid computing elements, storage elements and input/output elements according to a processing procedure constructed by software, firmware, programs, algorithms or the like.

The displaying apparatus 17 may be any of various known apparatuses capable of displaying image data, and it may be an apparatus independent of the computing apparatus 15 or an internal apparatus of the computing apparatus 15. For example, the displaying apparatus 17 may be but is not limited to: a cathode ray tube (CRT) display, a digital light processing (DLP) display, a plasma display, a liquid crystal display (LCD), a thin film transistor LCD (TFT-LCD), an organic light-emitting diode (OLED) display, a light-emitting diode (LED) display, an electroluminescence display (ELD), a surface-conduction electron-emitter display (SED), a field emission display (FED), a nano-emission display (NED) or the like. The displaying apparatus 17 may also be any of various types of touch screens. In some embodiments, the displaying apparatus 17 may comprise a projecting unit and a displaying unit, wherein the displaying unit is configured to display the physical content and the projecting unit is configured to project the virtual content on the displaying unit.

Figure 2:
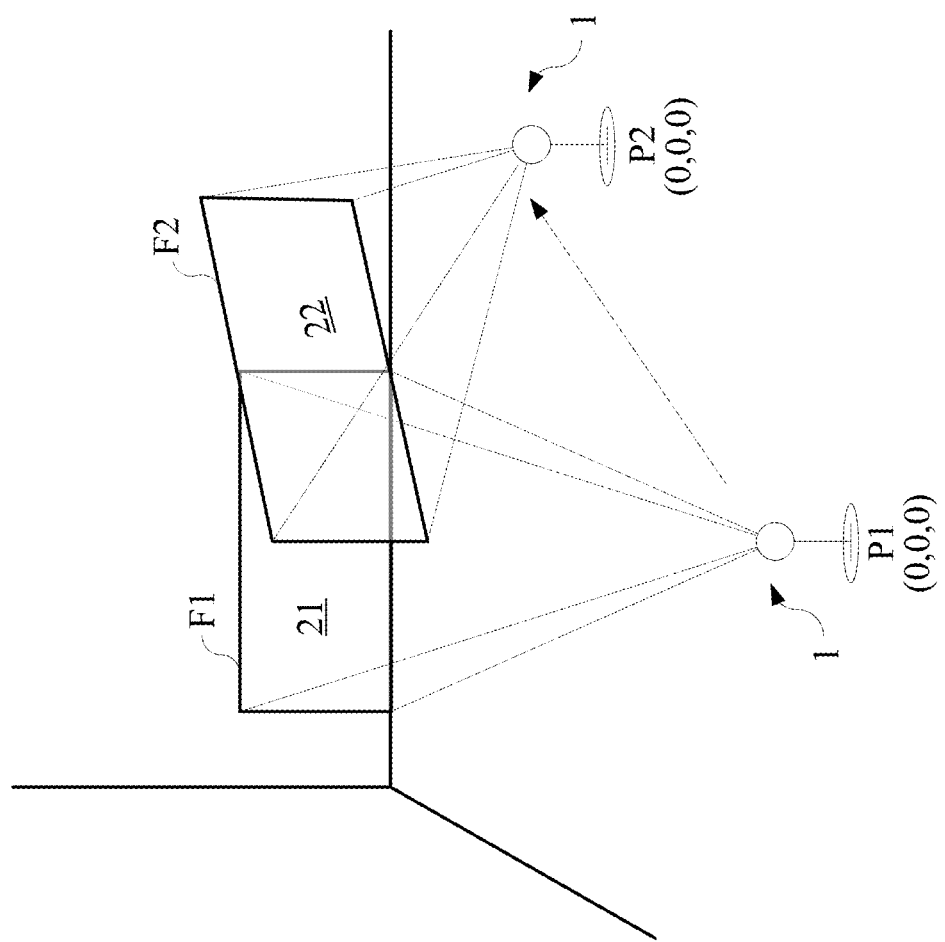
FIG. 2 is a schematic view illustrating the movement of the augmented reality system in a three-dimensional space according to one or more embodiments of the present invention.
Figure 3:
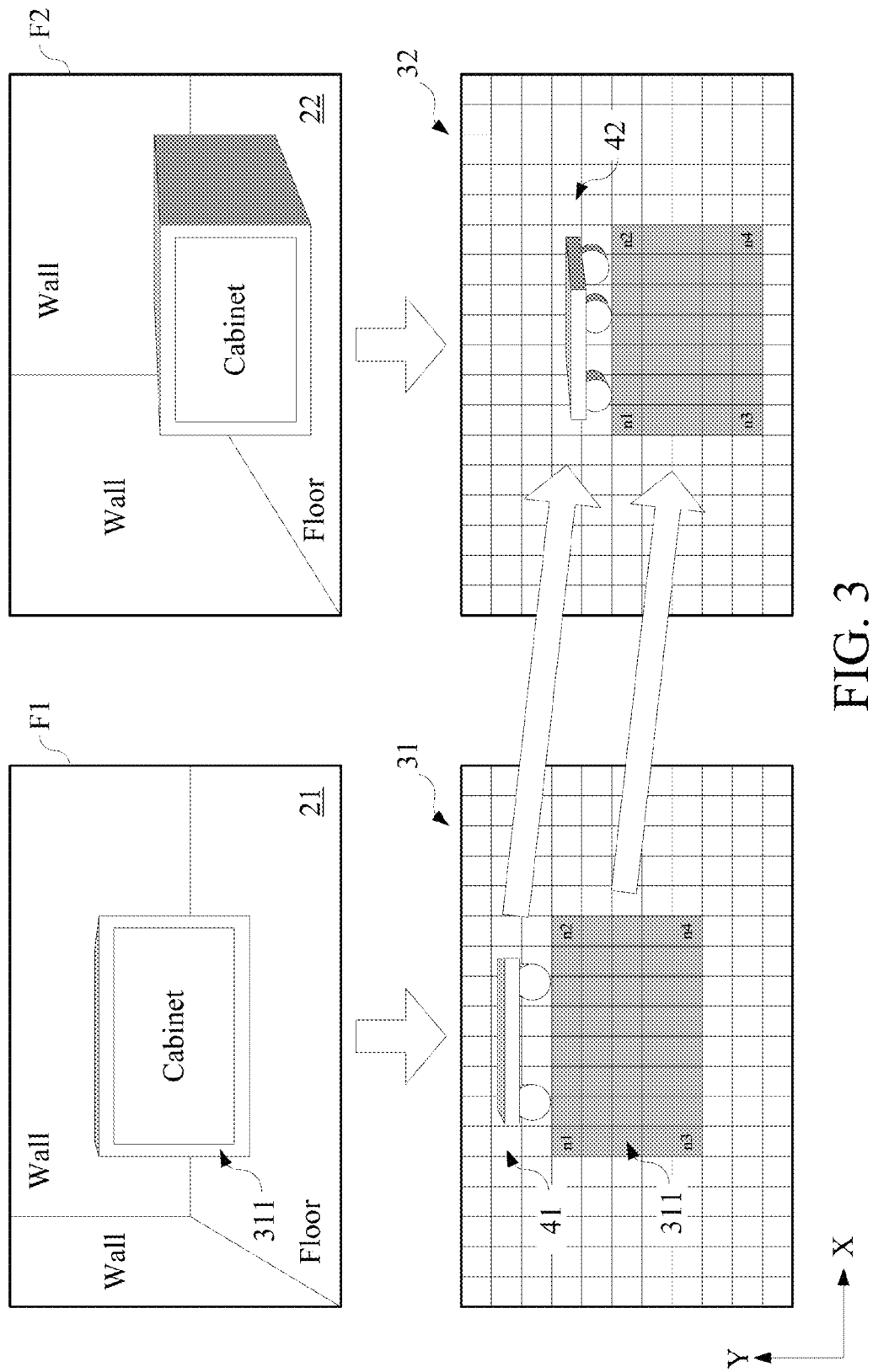
FIG. 3 illustrates how the augmented reality system generates the virtual content according to one or more embodiments of the present invention.
Figure 4:
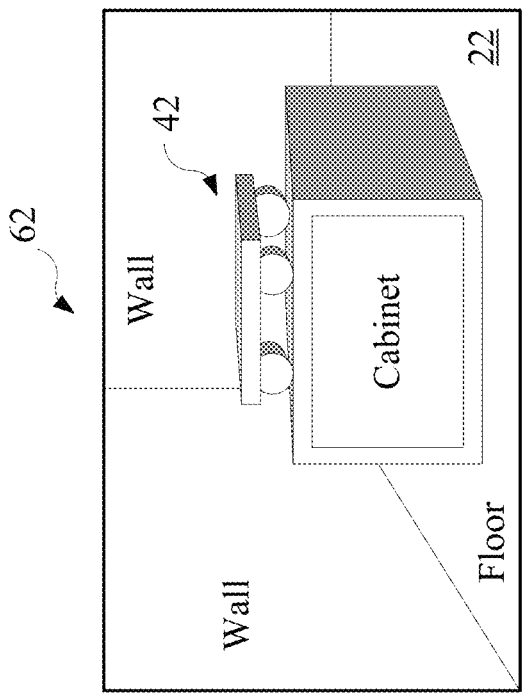
FIG. 4 illustrates views displayed by the augmented reality system before and after the movement thereof according to one or more embodiments of the present invention.
Figure 4:
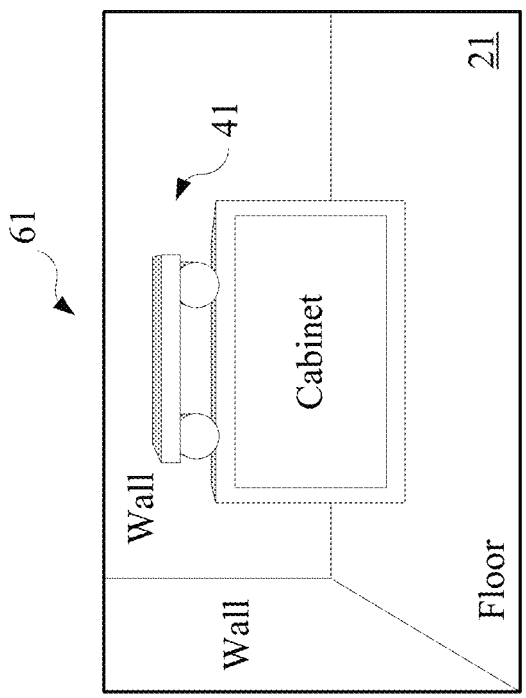

The augmented reality system 1 will be further described hereinafter by taking FIG. 2 to FIG. 4 as an exemplary example; however, this exemplary example is not intended to limit the present invention. FIG. 2 is a schematic view illustrating the movement of the augmented reality system 1 in a three-dimensional space according to one or more embodiments of the present invention. FIG. 3 illustrates how the augmented reality system 1 generates the virtual content according to one or more embodiments of the present invention. FIG. 4 illustrates views displayed by the augmented reality system 1 before and after the movement thereof according to one or more embodiments of the present invention.

Referring to FIG. 2, when the augmented reality system 1 is located at a first physical location P1, the image capturing apparatus 11 may capture a first physical content 21. For example, the first physical content 21 is an image of a front surface of a cabinet that is captured by the image capturing apparatus 11 right in front of the cabinet (i.e., from the first physical location P1), and it may be shown as an image comprising two walls and a cabinet placed on the floor within a first range of visibility F1.

Referring to FIG. 3, when the augmented reality system 1 is located at the first physical location P1, the depth sensing apparatus 13 may sense a depth of each pixel of the first physical content 21 to build a first point cloud coordinate system 31. For example, the depth sensing apparatus 13 may build the first point cloud coordinate system 31 in a three-dimensional space by taking the first physical position P1 as an origin, i.e., (0, 0, 0). The first point cloud coordinate system 31 may comprise a plurality of point clouds that correspond to the pixels of the first physical content 21 respectively, and each of the point clouds may be represented as a three-dimensional coordinate in the three-dimensional space with the first physical location P1 as the origin. For ease of description, each point cloud in the first point cloud coordinate system 31 is represented by a square block, and each square block corresponds to a pixel. In the three-dimensional space, each square block is represented by (x, y, z), wherein x and y represent the location of the corresponding pixel in the x-y plane, while z represents the depth of the pixel (in the direction entering into the paper).

After building the first point cloud coordinate system 31, the computing apparatus 15 may learn the three-dimensional coordinates of each pixel of the first physical content 21 in the first range of visibility F1 with respect to the first physical location P1 serving as the origin according to the first point cloud coordinate system 31. Therefore, the computing apparatus 15 may generate a first virtual content 41 based on the first point cloud coordinate system 31 and determine the location of the first virtual content 41 within the first range of visibility F1. Thereafter, the displaying apparatus 17 may display a first view 61 comprising the first physical content 21 and the first virtual content 41. As shown in FIG. 3 to FIG. 4, it is assumed in this exemplary example that the computing apparatus 15 presents the first virtual content 41 above the cabinet within the first range of visibility F1.

After building the first point cloud coordinate system 31, the computing apparatus 15 may also determine at least one plane 311 in the first point cloud coordinate system 31 (one or more planes may be determined). Because the first point cloud coordinate system 31 corresponds to the first physical content 21, the plane 311 determined in the first point cloud coordinate system 31 by the computing apparatus 15 is substantially the corresponding plane in the first physical content 21. The plane 311 may be any plane in the first physical content 21, e.g., the wall, the floor or a surface of the cabinet. For ease of description, it is assumed in this exemplary example that the plane 311 determined by the computing apparatus 15 is the front surface of the cabinet in the first physical content 21.

After determining the at least one plane 311, the computing apparatus 15 may also determine at least one plane point in each plane 311. In response to different requirements, the computing apparatus 15 may use all plane points in each plane 311, or may use a part of the plane points in each plane 311. The computing apparatus 15 may determine at least one plane point in the at least one plane 311 through a preset threshold (e.g., the total number of plane points). For example, the computing apparatus 15 may divide each plane 311 into a plurality of sub-planes, and then select a same number or different numbers of plane points from each sub-plane for use according to the preset threshold. The total number of the plane points is in direct proportion to the computing accuracy, but is in inverse proportion to the computing time. For ease of description, it is assumed in this exemplary example that the computing apparatus 15 determines 4 plane points in the plane 311, i.e., plane points n1, n2, n3 and n4 shown in FIG. 3.

Referring back to FIG. 2, when the augmented reality system 1 is located at a second physical location P2, e.g., moves to the second physical location P2 from the first physical location P1, the image capturing apparatus 11 may capture a second physical content 22. The second physical content 22 is an image of a side surface of the cabinet that is captured by the image capturing apparatus 11 in the left front direction of the cabinet (i.e., from the second physical location P2), and it may be shown as an image also comprising the two walls and the cabinet within a second range of visibility F2. In this exemplary example, the first physical content 21 and the second physical content 22 may be shown as images of a same target (i.e., the cabinet) that are captured by the image capturing apparatus 11 from different locations and directions.

Referring to FIG. 3, when the augmented reality system 1 is located at the second physical location P2, the depth sensing apparatus 13 may sense a depth of each pixel of the second physical content 22 to build a second point cloud coordinate system 32. For example, the depth sensing apparatus 13 may build the second point cloud coordinate system 32 in a three-dimensional space by taking the second physical position P2 as an origin, i.e., (0, 0, 0). The second point cloud coordinate system 32 may comprise a plurality of point clouds that correspond to the pixels of the second physical content 22 respectively, and each of the point clouds may be represented as a three-dimensional coordinate in the three-dimensional space with the second physical location P2 as the origin. Similar to the first point cloud coordinate system 31, each point cloud in the second point cloud coordinate system 32 is represented by a square block, and each square block corresponds to a pixel. In the three-dimensional space, each square block is represented by (x, y, z), wherein x and y represent the location of the corresponding pixel in the x-y plane, while z represents the depth of the pixel (in the direction entering into the paper).

After building the second point cloud coordinate system 32, the computing apparatus 15 may compute coordinate variance of the plane points n1 to n4 from the first point cloud coordinate system 31 to the second point cloud coordinate system 32. For example, the computing apparatus 15 may identify and/or track the three-dimensional coordinates of the plane points n1 to n4 in the second point cloud coordinate system 32 through the known image identifying technology and/or image tracking technology, and then compute the coordinate variance of the plane points n1 to n4 by comparing the three-dimensional coordinates of the plane points n1 to n4 in the first point cloud coordinate system 31 with the three-dimensional coordinates of the plane points n1 to n4 in the second point cloud coordinate system 32.

After computing the coordinate variance of the plane points n1 to n4, the computing apparatus 15 may transfer the first virtual content 41 from the first point cloud coordinate system 31 to the second point cloud coordinate system 32 according to the coordinate variance to compute the location of the first virtual content 41 in the second point cloud coordinate system 32, and then generate a second virtual content 42 corresponding to the first virtual content 41 on the location. The location on which the first virtual content 41 is located in the second point cloud coordinate system 32 may be equivalent to a plurality of coordinate points in the second point cloud coordinate system 32. In detail, since the plane points n1 to n4 are points on the same plane 311, there are linear relationships between the plane points n1 to n4. Through the linear relationships, the computing apparatus 15 may compute the relative movement relationships of the plane points n1 to n4 before and after the movement of the augmented reality system 1.

The relative movement relationships may be represented as a transformation matrix, and the matrix comprises three parameters, i.e., translation, rotation and scaling. The transformation matrix may comprise parameters required for transferring any three-dimensional coordinate in a coordinate system to another coordinate system. In other words, through the aforesaid linear relationships, the computing apparatus 15 may compute the translation, the rotation and the scaling of the plane points n1 to n4 from the first point cloud coordinate system 31 to the second point cloud coordinate system 32. According to the translation, the rotation and the scaling, the computing apparatus 15 may correspondingly transfer the first virtual content 41 from the first point cloud coordinate system 31 to the second point cloud coordinate system 32 to compute the location of the first virtual content 41 in the second point cloud coordinate system 32, and then generate the second virtual content 42 on the location. If the coordinate variance of any plane point n between the first point cloud coordinate system 31 and the second point cloud coordinate system 32 only comprises one or a portion of the translation, the rotation and the scaling, then the computing apparatus 15 may only consider the one or the portion of the translation, the rotation and the scaling. During the process of generating the second virtual content 42, it is unnecessary for the computing apparatus 15 to determine the current location and/or direction of the augmented reality system 1 or to determine the change in the location and/or direction of the second physical position P2 with respect to the first physical position P1.

After generating the second virtual content 42, the displaying apparatus 17 may display a second view 62 comprising the second physical content 22 and the second virtual content 42. As shown in FIG. 3 to FIG. 4, the second virtual content 42 is the virtual image of the side surface of first virtual content 41 observed from the left front direction of the cabinet (i.e., from the second physical position P2) when the augmented reality system 1 is located at the second physical position P2.

After building the second point cloud coordinate system 32, the computing apparatus 15 may also determine at least one plane in the second point cloud coordinate system 32, and determine at least one plane point from the at least one plane. When the augmented reality system 1 moves from the second physical position P2 to a third physical position, the image capturing apparatus 11 may capture a third physical content, and the depth sensing apparatus 13 may sense a depth of each pixel of the third physical content to build a third point cloud coordinate system. Next, the computing apparatus 15 may compute the coordinate variance of the at least one plane point from the second point cloud coordinate system 32 to the third point cloud coordinate system and transfer the second virtual content 42 from the second point cloud coordinate system 32 to the third point cloud coordinate system according to the coordinate variance to compute the location of the second virtual content 42 in the third point cloud coordinate system, and then generate a third virtual content corresponding to the second virtual content on the location. The location on which the second virtual content 42 is located in the third point cloud coordinate system may be equivalent to a plurality of coordinate points in the third point cloud coordinate system. Then, the displaying apparatus 17 may display a third view at the third physical location, and the third view comprises the third physical content and the third virtual content.

Figure 5:
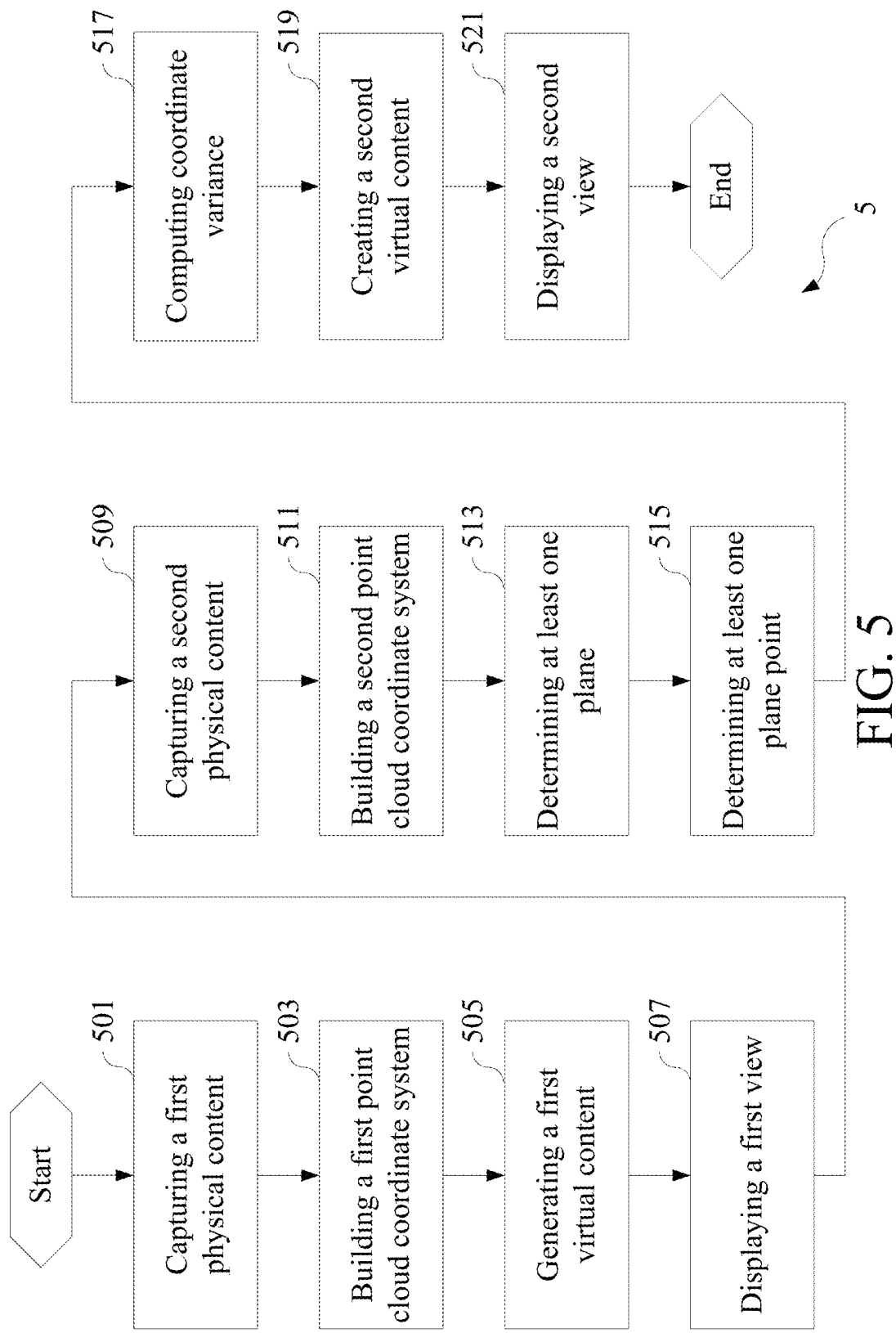
FIG. 5 illustrates a flowchart diagram of an augmented reality method according to one or more embodiments of the present invention.

FIG. 5 illustrates a flowchart diagram of an augmented reality method according to one or more embodiment of the present invention. Referring to FIG. 5, an augmented reality method 5 may comprise the following steps: capturing a first physical content at a first physical location by an image capturing apparatus (labeled as 501); sensing a depth of each pixel of the first physical content by a depth sensing apparatus to build a first point cloud coordinate system (labeled as 503); generating a first virtual content based on the first point cloud coordinate system by a computing apparatus (labeled as 505); displaying a first view at the first physical location by the displaying apparatus, wherein the first view comprises the first physical content and the first virtual content (labeled as 507); capturing a second physical content at a second physical location by the image capturing apparatus (labeled as 509); sensing a depth of each pixel of the second physical content by the depth sensing apparatus to build a second point cloud coordinate system for a second view (labeled as 511); determining at least one plane in the first point cloud coordinate system by the computing apparatus (labeled as 513); determining at least one plane point in the at least one plane by the computing apparatus (labeled as 515); computing coordinate variance of the at least one plane point from the first point cloud coordinate system to the second point cloud coordinate system by the computing apparatus (labeled as 517); calculating a location of the first virtual content in the second point cloud coordinate system according to the coordinate variance by the computing apparatus to create a corresponding second virtual content on the location (labeled as 519); and displaying a second view at the second physical location by the displaying apparatus, wherein the second view comprises the second physical content and the second virtual content (labeled as 521). In FIG. 5, the order in which the steps 501 to 521 are presented is not intended to limit the augmented reality method 5, and it may be adjusted without departing from the spirit of the present invention. For example, the steps 513 and 515 may be moved after the step 503, and the step 517 may be moved after the step 511.

According to one or more embodiments of the present invention, the depth sensing apparatus may build the first point cloud coordinate system by taking the first physical location as an origin, and build the second point cloud coordinate system by taking the second physical location as an origin.

According to one or more embodiments of the present invention, the computing apparatus may determine the at least one plane point in the at least one plane through a preset threshold.

According to one or more embodiments of the present invention, the computing apparatus may compute translation, rotation and scaling of the at least one plane point from the first point cloud coordinate system to the second point cloud coordinate system according to the coordinate variance, and calculate the location of the first virtual content in the second point cloud coordinate system according to the translation, the rotation and the scaling.

According to one or more embodiments of the present invention, the displaying apparatus may comprise a projecting unit and a displaying unit, the displaying unit may be configured to display the first physical content and the second physical content, and the projecting unit may be configured to project the first virtual content and the second virtual content on the displaying unit.

According to one or more embodiments of the present invention, the augmented reality method 5 may be applied to the augmented reality system 1 to accomplish all of the operations of the augmented reality system 1. Since the corresponding steps for accomplishing the operations by the augmented reality method 5 may be directly appreciated by those of ordinary skill in the art based on the aforesaid description of the augmented reality system 1, the relevant details thereof will not be further described herein.

According to the above descriptions, when the image capturing apparatus moves, the present invention may build a first point cloud coordinate system and a second point cloud coordinate system respectively according to depth information of the physical contents captured by the image capturing apparatus before and after the movement thereof. Also, the preset invention may transfer the virtual content generated based on the first point cloud coordinate system to the second point cloud coordinate system according to the coordinate variance of the at least one plane point of the at least one plane in the first point cloud coordinate system from the first point cloud coordinate system (i.e., the previous point cloud coordinate system) to the second point cloud coordinate system (i.e., the current point cloud coordinate system) to obtain the location of the virtual content, which is generated based on the first point cloud coordinate system, in the second point cloud coordinate system, and then generate the corresponding virtual content on the location. Different from the conventional augmented reality technology, the present invention enables the computing apparatus to provide the corresponding virtual content as the image capturing apparatus moves without the need of creating a plurality of feature point maps in advance, so the time cost can be saved. Additionally, the present invention only uses the plane information of the physical content captured by the image capturing apparatus (i.e., at least one plane point of at least one plane in the first point cloud coordinate system), so the same effect can be achieved even if the space complexity of the physical content captured by the image capturing apparatus is not high. In other words, the physical content captured by the image capturing apparatus does not need to comprise many available feature points in the present invention. Thus, the present invention effectively improves the conventional augmented reality technology.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An augmented reality system, comprising:
a camera, being configured to capture a first physical content at a first physical location and capture a second physical content at a second physical location;
a depth sensor, being configured to sense a depth of each pixel of the first physical content to build a first point cloud coordinate system, and sense a depth of each pixel of the second physical content to build a second point cloud coordinate system;
a computer, being configured to generate a first virtual content based on the first point cloud coordinate system, determine at least one plane in the first point cloud coordinate system, determine at least one plane point in the at least one plane, compute coordinate variance of the at least one plane point from the first point cloud coordinate system to the second point cloud coordinate system, and calculate a location of the first virtual content in the second point cloud coordinate system according to the coordinate variance to create a corresponding second virtual content on the location; and a display, being configured to display a first view at the first physical location and display a second view at the second physical location, wherein the first view comprises the first physical content and the first virtual content, and the second view comprises the second physical content and the second virtual content.

2. The augmented reality system of claim 1, wherein the depth sensor builds the first point cloud coordinate system by taking the first physical location as an origin, and builds the second point cloud coordinate system by taking the second physical location as an origin.

3. The augmented reality system of claim 1, wherein the computer determines the at least one plane point in the at least one plane through a preset threshold.

4. The augmented reality system of claim 1, wherein the computer computes translation, rotation and scaling of the at least one plane point from the first point cloud coordinate system to the second point cloud coordinate system according to the coordinate variance, and calculates the location of the first virtual content in the second point cloud coordinate system according to the translation, the rotation and the scaling.

5. The augmented reality system of claim 1, wherein the display comprises a projecting unit and a displaying unit, the displaying unit is configured to display the first physical content and the second physical content, and the projecting unit is configured to project the first virtual content and the second virtual content on the displaying unit.

6. An augmented reality method, comprising:
capturing a first physical content at a first physical location by a camera;
sensing a depth of each pixel of the first physical content by a depth sensor to build a first point cloud coordinate system;
generating a first virtual content based on the first point cloud coordinate system by a computer;
displaying a first view at the first physical location by a display, wherein the first view comprises the first physical content and the first virtual content;
capturing a second physical content at a second physical location by the camera;
sensing a depth of each pixel of the second physical content by the depth sensor to build a second point cloud coordinate system for a second view;
determining at least one plane in the first point cloud coordinate system by the computer;
determining at least one plane point in the at least one plane by the computer;
computing coordinate variance of the at least one plane point from the first point cloud coordinate system to the second point cloud coordinate system by the computer;
calculating a location of the first virtual content in the second point cloud coordinate system according to the coordinate variance by the computer to create a second virtual content on the location; and
displaying a second view at the second physical location by the display, wherein the second view comprises the second physical content and the second virtual content.

7. The augmented reality method of claim 6, wherein the depth sensor builds the first point cloud coordinate system by taking the first physical location as an origin, and builds the second point cloud coordinate system by taking the second physical location as an origin.

8. The augmented reality method of claim 6, wherein the computer determines the at least one plane point in the at least one plane through a preset threshold.

9. The augmented reality method of claim 6, wherein the computer computes translation, rotation and scaling of the at least one plane point from the first point cloud coordinate system to the second point cloud coordinate system according to the coordinate variance, and calculates the location of the first virtual content in the second point cloud coordinate system according to the translation, the rotation and the scaling.

10. The augmented reality method of claim 6, wherein the display comprises a projecting unit and a displaying unit, the displaying unit is configured to display the first physical content and the second physical content, and the projecting unit is configured to project the first virtual content and the second virtual content on the displaying unit.

* * * * *